(12) United States Patent
Sbisa et al.

(10) Patent No.: US 7,298,740 B2
(45) Date of Patent: Nov. 20, 2007

(54) CENTRALIZED SERVICE CONTROL FOR A TELECOMMUNICATION SYSTEM

(75) Inventors: Daniel Charles Sbisa, Blue Springs, MO (US); Anis Khalil, Overland Park, KS (US); Warren B Cope, Olathe, KS (US); John T Susbilla, Milpitas, CA (US); Ramaswami Rangarajan, Belmont, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1407 days.

(21) Appl. No.: 10/193,569

(22) Filed: Jul. 11, 2002

(65) Prior Publication Data

US 2004/0032864 A1 Feb. 19, 2004

(51) Int. Cl.
*H04L 12/28* (2006.01)
*H04L 12/56* (2006.01)

(52) U.S. Cl. ................... 370/389; 370/410

(58) Field of Classification Search ............. 370/389, 370/401, 400, 410, 351, 356, 392, 422, 426, 370/398

See application file for complete search history.

(56) References Cited

U.S. PATENT DOCUMENTS

| | | | |
|---|---|---|---|
| 5,418,844 A | 5/1995 | Morrisey et al. | |
| 5,448,633 A | 9/1995 | Jamaleddin | |
| 5,467,388 A * | 11/1995 | Redd et al. | 379/210.02 |
| 5,524,146 A | 6/1996 | Morrisey et al. | |
| 5,566,235 A | 10/1996 | Hetz | |
| 5,572,583 A | 11/1996 | Wheeler, Jr. et al. | |
| 5,590,187 A | 12/1996 | Greenspan | |
| 5,675,635 A | 10/1997 | Vos et al. | |
| 5,684,866 A | 11/1997 | Florindi et al. | |
| 5,694,463 A | 12/1997 | Christie et al. | |
| 5,790,634 A * | 8/1998 | Kinser et al. | 379/29.01 |
| 5,793,853 A | 8/1998 | Sbisa | |
| 5,825,780 A | 10/1998 | Christie | |
| 5,828,740 A | 10/1998 | Khuc et al. | |
| 5,864,614 A | 1/1999 | Farris et al. | |
| 5,920,562 A | 7/1999 | Christie et al. | |
| 5,923,745 A | 7/1999 | Hurd | |
| 5,926,538 A | 7/1999 | Deryugin et al. | |

(Continued)

FOREIGN PATENT DOCUMENTS

DE 199 54 224 A 1 5/2001

(Continued)

OTHER PUBLICATIONS

Dehni, Tarek, et al., "Intelligent Networks and the HP OpenCall Technology," Aug. 1997 Hewlett-Packard Journal, Article 6, XP-002259853, pp. 1-14.

(Continued)

*Primary Examiner*—Ajit Patel

(57) ABSTRACT

A communication system includes a switching system and a service control system. The switching system receives and processes a communication request to transfer a query message. The service control system receives and processes the query message to generate and transfer a response message indicating a route. The switching system receives and processes the response message indicating the route and transfers a communication using the route. The service control system may process the query message with multiple parallel functions to generate an action message and process the action message to select the route.

36 Claims, 7 Drawing Sheets

U.S. PATENT DOCUMENTS

| | | | |
|---|---|---|---|
| 5,933,486 A | 8/1999 | Norby et al. | |
| 5,949,869 A | 9/1999 | Sink et al. | |
| 5,987,118 A | 11/1999 | Dickerman et al. | |
| 5,993,486 A | 11/1999 | Tomatsu | |
| 6,075,855 A | 6/2000 | Christiansen et al. | |
| 6,097,803 A | 8/2000 | Sbisa | |
| 6,148,069 A | 11/2000 | Ekstrom et al. | |
| 6,215,864 B1 | 4/2001 | Goyal et al. | |
| 6,262,992 B1 | 7/2001 | Nelson et al. | |
| 6,470,081 B1 | 10/2002 | Sbisa et al. | |
| 6,529,504 B1 | 3/2003 | Sbisa | |
| 6,567,659 B1 | 5/2003 | Sbisa | |
| 6,574,319 B2 | 6/2003 | Latter et al. | |
| 6,603,851 B1 | 8/2003 | Smith et al. | |
| 6,611,590 B1 | 8/2003 | Lu et al. | |
| 6,690,656 B1 | 2/2004 | Christie et al. | |
| 2004/0032864 A1 | 2/2004 | Sbisa et al. | |
| 2005/0157739 A1* | 7/2005 | Nelson et al. | 370/426 |
| 2006/0239268 A1* | 10/2006 | Schneider et al. | 370/395.1 |

FOREIGN PATENT DOCUMENTS

| | | |
|---|---|---|
| EP | 0 631 447 A2 | 12/1994 |
| EP | 0 901 297 A2 | 3/1999 |
| WO | WO 99/35859 | 7/1999 |
| WO | WO 00/42782 | 7/2000 |

OTHER PUBLICATIONS

Briere, Daniel, "Sprint plans sweeping Network Revisions," Network World, Sep. 20, 1993, Network World, Inc.

* cited by examiner

CENTRALIZED SERVICE CONTROL FOR A TELECOMMUNICATION SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to centralized service control for a telecommunication system.

2. Description of the Prior Art

A telecommunication network uses service logic and connection logic to process telephone calls. The service logic determines the routes or other treatment for the calls. The connection logic transfers the call communications over the selected routes or applies the other treatment. Some examples of service logic include trigger detection logic, caller number validation logic, and called number translation logic.

In current telecommunication networks, the connection logic resides in switching systems and the service logic is split between the switching systems and Service Control Points (SCPs). Although the SCPs are typically centralized, the switching systems are geographically dispersed throughout the telecommunications system. Thus, large portions of the service logic are also geographically dispersed and replicated throughout the telecommunications system. This situation leads to a host of problems.

Switching systems are large and complex, so service logic must be tailored for each type of switching system. For example, service logic that checks the caller number before allowing a call (caller validation) has to be separately customized for switching systems from different manufacturers. This customization burden constrains a network's ability to deploy many types of switching systems, and thus, inhibits competition among switching system manufacturers. In addition, service logic modification is difficult when changes must be coordinated across multiple geographically dispersed switching systems. Modifications must be replicated in many copies of the service logic. Modifications typically must also be implemented with the cooperation of the switching system supplier—often at a steep cost to the telecommunication network. The service logic for a telecommunication system is continually updated. For example, the service logic in multiple switching systems are updated when a new area code is added or when traffic is re-homed.

Various technologies have been developed to centralize service logic in a telecommunications network. For example, SCPs centralize "800" call routing and calling card logic. Sprint Corporation, the assignee of this application, has developed a robust set of technologies to centralize large portions of service logic externally to the switching systems, however, refinements and improvements to those technologies are still desired.

SUMMARY OF THE INVENTION

The invention helps solve the above problems by centralizing service logic through a transaction agent. Advantageously, this centralization eliminates the need to deploy and modify service logic in geographically dispersed switching systems. The centralization also eliminates the need to customize the service logic for diverse switching systems. In addition, the transaction agent can provide an interface between multiple switching systems and multiple sets of service logic, so the switching systems and service logic may use their own specific message formats and data.

Some examples of the invention comprise communication systems and methods. The communication systems include a first switching system and a service control system. The first switching system receives and processes a first communication request for a first communication to determine if the first communication request indicates a first route. If the first communication request does indicate the first route, then the first switching system transfers the first communication using the first route. If the first communication request does not indicate the first route, then the first switching system transfers a first query message, receives and processes a first response message indicating the first route, and transfers the first communication using the first route. The service control system receives and processes the first query message to generate and transfer the first response message indicating the first route. The first route identifies one of a downstream switch, network element, connection, switch/trunk, and packet address.

In some examples of the invention, the communication systems include a second switching system that receives and processes a second communication request for a second communication to determine if the second communication request indicates a second route. If the second communication request does indicate the second route, then the second switching system transfers the second communication using the second route. If the second communication request does not indicate the second route, then the second switching system transfers a second query message, receives and processes a second response message indicating the second route, and transfers the second communication using the second route. The service control system receives and processes the second query message to generate and transfer the second response message indicating the second route. In some examples of the invention, the first query message and the second query message have different query message formats. In some examples of the invention, the first switching system and the second switching system are from different manufacturers. In some examples of the invention, the first switching system and the second switching system are in different communication systems. In some examples of the invention, the first switching system comprises one of a class four switch and a class five switch and the second switching system comprises one of a packet switch and a packet router. In some examples of the invention, the first switching system comprises one of a class four switch and a class five switch and the second switching system comprises a wireless switch. In some examples of the invention, the first switching system comprises one of a packet switch and a packet router and the second switching system comprises a wireless switch.

In some examples of the invention, the service control system processes the query message with multiple parallel functions to generate an action message and processes the action message to select the first route. In some examples of the invention, one of the parallel functions comprises a called number function, nature of number function, caller number function, originating line identification function, originating switching system function, originating trunk function, trigger index function, call reference identification function, or carrier identification code function.

Some examples of the invention include communication service control systems, methods, and software products. The systems include a transaction agent processing system and interface. The software products include software to direct a processing system and a storage system that stores the software. The transaction agent interface receives a first query message. The transaction agent processing system processes the first query message with a plurality of parallel functions to generate a first action message having data from the first query message. The transaction agent interface transfers the first action message. The transaction agent interface receives a return message. The transaction agent processing system processes the return message indicating communication handling data to generate a response message indicating the communication handling data. The transaction agent interface transfers the response message.

In some examples of the invention, at least some of the parallel functions include data structures having entries, wherein the entries have corresponding scores and action types. The transaction agent processing system attempts to match data from the first query message with the entries, and transfers the first action message based on one of the action types for a matching one of the entries having a highest one of the scores. In some examples of the invention, one of the data structures comprises a called number data structure, nature of number data structure, caller number data structure, originating line identification data structure, originating switching system data structure, originating trunk data structure, trigger index data structure, call reference identification data structure, or carrier identification code data structure.

In some examples of the invention, the communication service control systems includes a service control interface and a service control processing system. The service control interface receives the first action message. The service control processing system processes the first action message with an action function corresponding to the action message to generate the return message indicating the communication handling data. The service control interface transfers the return message. In some examples of the invention, the action function comprises local telephone call processing logic, domestic long distance telephone call processing logic, international telephone call processing logic, wireless telephone call processing logic, packet network telephone call processing logic, POTS telephone call processing logic, toll-free telephone call processing logic, or Virtual Private Network telephone call processing logic.

In some examples of the invention, the call-handling data identifies one of a downstream switch, network element, connection, switch/trunk, and packet address.

In some examples of the invention, the transaction agent processing system processes a second query message with the plurality of parallel functions to generate a second action message. The first query message and the second query message have different query message formats, and the first action message and the second action message have the same action message format.

BRIEF DESCRIPTION OF THE DRAWINGS

The same reference number represents the same element on all drawings.

DETAILED DESCRIPTION OF THE PREFERRED EMBODIMENT

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features and examples described below can be combined in various ways to form multiple variations of the invention. As a result, the invention is not limited to the specific examples and details described below, but only by the claims and their equivalents.

Figure 1:
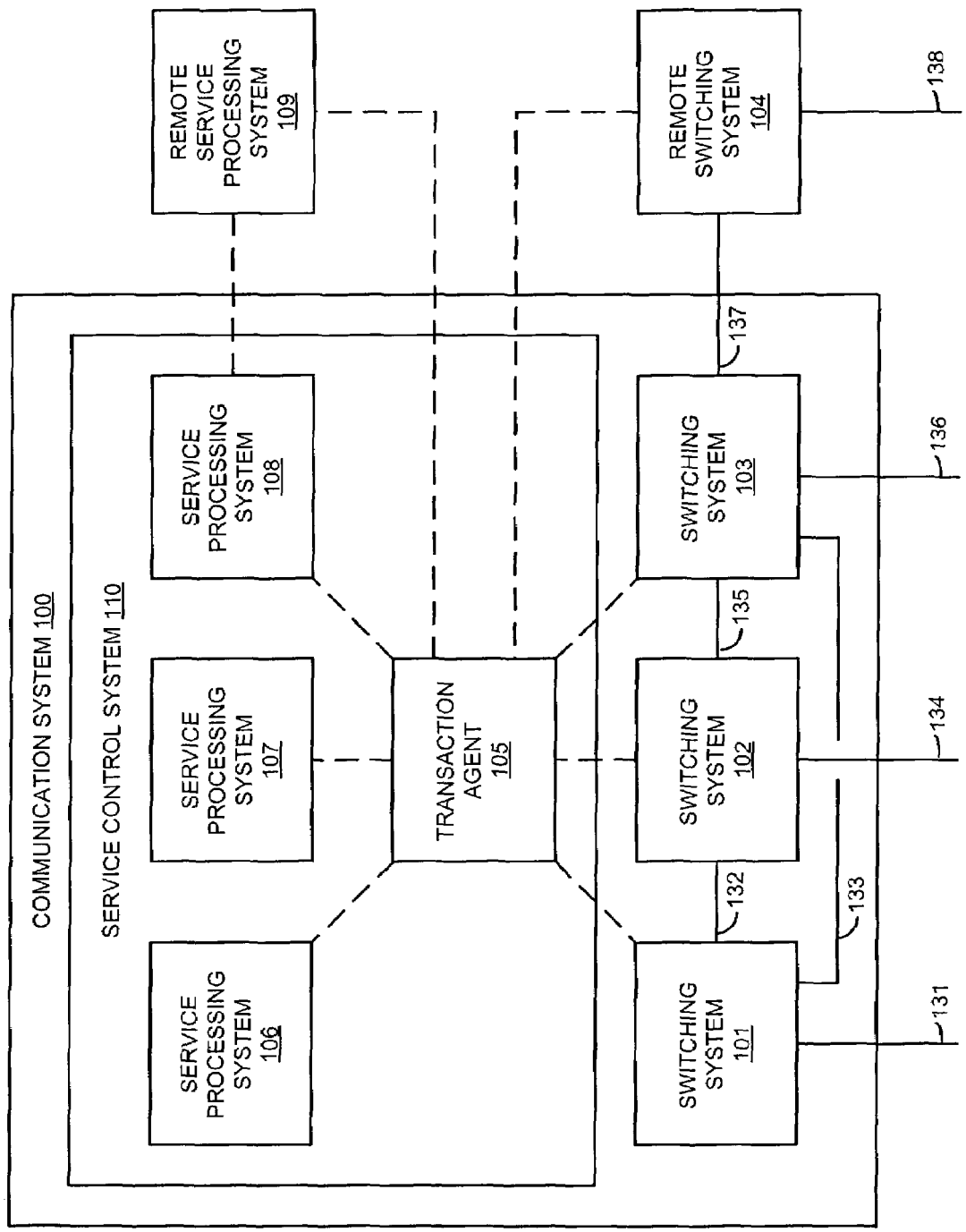
FIG. 1 illustrates a communication system in an example of the invention.
Figure 2:
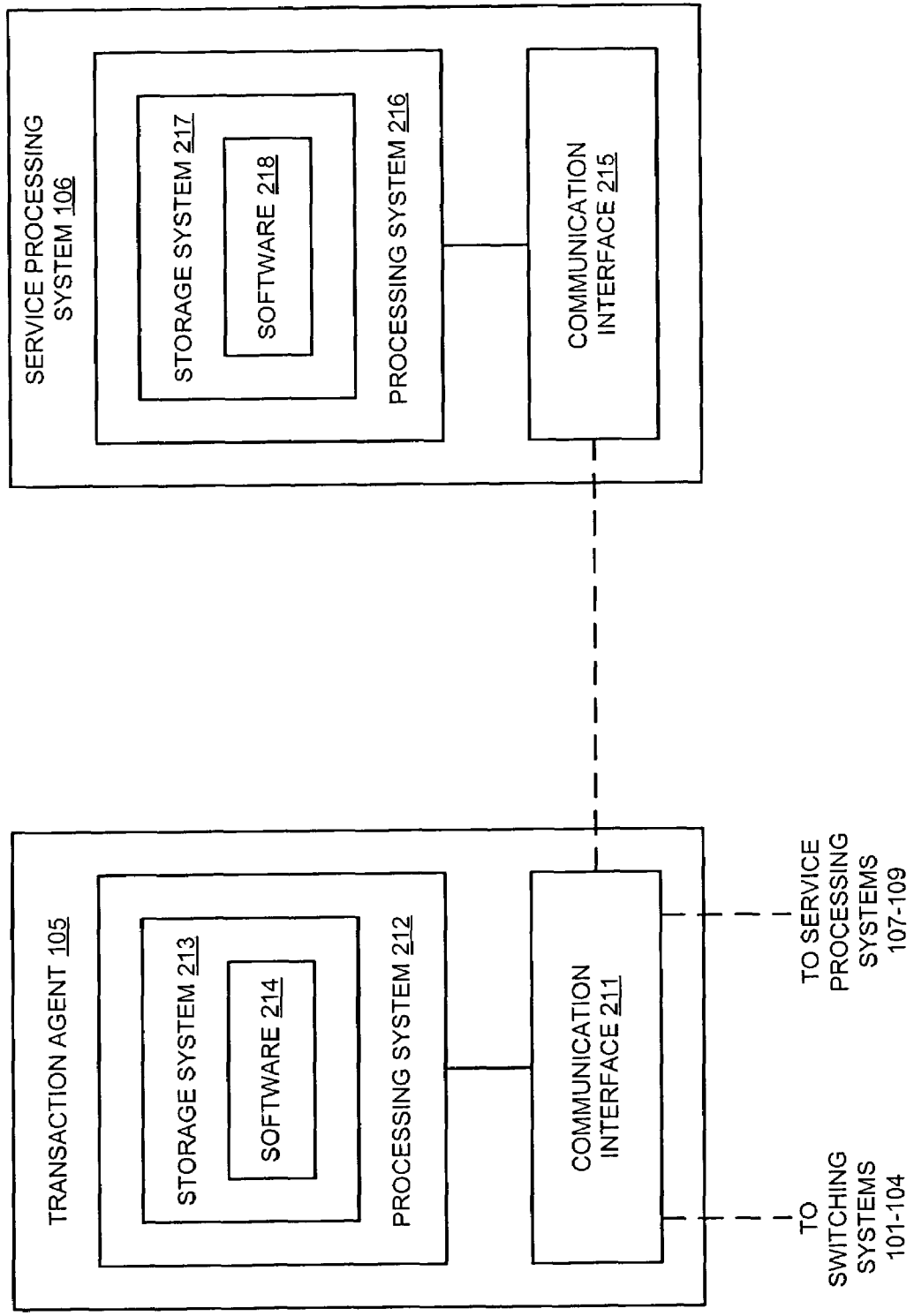
FIG. 2 illustrates a service data point and a service processing system in an example of the invention.
Figure 3:
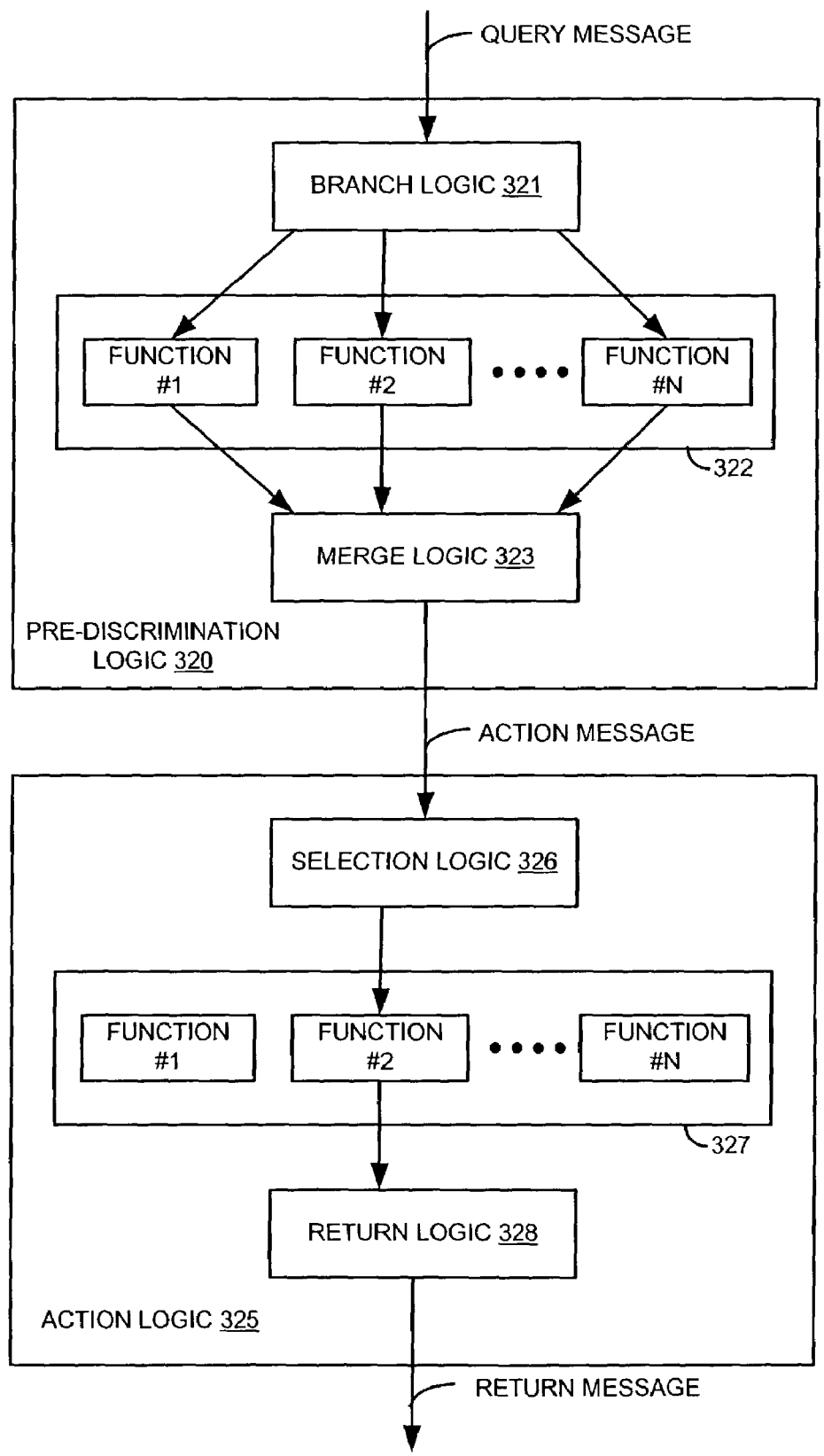
FIG. 3 illustrates a logical architecture for centralized service control in an example of the invention.

Communication System—FIGS. 1-3

FIG. 1 illustrates communication system 100 in an example of the invention. Communication system 100 includes switching systems 101-103, and service control system 110. Service control system 110 includes transaction agent 105 and service processing systems 106-108. Transaction agent 105 is linked to switching systems 101-103 and service processing systems 106-108. Switching systems 101-103 are linked together and to external systems (not shown) according to the following data structure, and typically, there are more systems and links than are shown on FIG. 1, but the number is restricted for clarity.

| LINK | BETWEEN | | | |
|---|---|---|---|---|
| 131 | SWITCHING SYSTEM | 101 | EXTERNAL SYSTEMS | |
| 132 | SWITCHING SYSTEM | 101 | SWITCHING SYSTEM | 102 |
| 133 | SWITCHING SYSTEM | 101 | SWITCHING SYSTEM | 103 |
| 134 | SWITCHING SYSTEM | 102 | EXTERNAL SYSTEMS | |
| 135 | SWITCHING SYSTEM | 102 | SWITCHING SYSTEM | 103 |
| 136 | SWITCHING SYSTEM | 103 | EXTERNAL SYSTEMS | |
| 137 | SWITCHING SYSTEM | 103 | SWITCHING SYSTEM | 104 |
| 138 | SWITCHING SYSTEM | 104 | EXTERNAL SYSTEMS | |

Transaction agent 105 is linked to remote switching system 104 and remote service processing system 109. Service processing system 108 is also linked to remote service processing system 109. Systems 104 and 109 are not included in communication system 100, and may be in separate systems themselves. For example, transaction agent 105 could be located within a telecommunication service provider, and remote systems 104 and 109 could be located at another business or other service provider. Remote system 104 could be located in one business or service provider and remote system 109 could be located in another business or service provider.

Switching systems 101-104 transfer communications between users. The communications may include voice, data, video, audio, or some other user information. For example, a first user may be connected to switching system 101 over link 131 and a second user may be connected to switching system 103 over link 136. Switching system 101 would receive communications from the first user over link 131 and transfer them to switching system 103 over link 133. Switching system 103 would receive the communications from switching system 101 and transfer them to the second user over link 136. Switching systems 101-104 could include class four and five switches, packet switches and routers, distributed switches (soft switches and media gateways), wireless switches, international switches, satellite switches, and other communication systems that transfer user communications.

Service processing systems 106-109 provide communication-handling information in response to queries. For example, service processing system 107 may receive a message from transaction agent 105 requesting a communication route. Service processing system 107 would select the route and transfer a message back to transaction agent 105 indicating the route. Service processing systems 106-109 could include SCPs, call processors, communication databases, and other processing systems that control communications. Communication-handling information indicates a route or other treatment for handling the communications.

In operation, switching systems 101-104 receive communication requests from the external systems. In response to the communication requests, switching systems 101-104 transfer queries to transaction agent 105. Transaction agent 105 processes the queries with pre-discrimination logic to transfer action messages to service processing systems 106-109. Service processing systems 106-109 process the action messages with action logic to return communication-handling data to transaction agent 105. Transaction agent 105 transfers responses to switching systems 101-104 indicating the communication-handling data. Switching systems 101-104 provide the communication based on the communication-handling data.

In some examples, a switching system transfers a query message to transaction agent 105 if the communication request does not identify a route. In the context of the invention, a route is a switch, network element, connection, switch/trunk or packet address that operates downstream from the switching system that receives the communication request. Consider that switching system 101 receives a communication request for communications from connection 131. If the communication request identifies switching system 103 as the route, then switching system 101 transfers the communications to switching system 103 and does not transfer the query message to transaction agent 105. If the communication request identifies connection 133 as the route, then switching system 101 transfers the communications over connection 133 and does not transfer the query message to transaction agent 105. If the communication request identifies connection 136 as the route, then switching system 101 transfers the communications to switching system 103 for transfer to connection 136 and does not transfer the query message to transaction agent 105. In some cases the route is indicated by both switch and connection—referred to as a switch/trunk. For example, the communication request to switching system 101 could identify switching system 103 and connection 136 as the switch/trunk and no query message would be required. In addition, the communication request to switching system 101 could identify a packet address (such as an ATM or IP address) as the route, so switching system 101 would transfer the call communications in packets having the address and would not need to transfer the query message to transaction agent 105. Many call request messages will contain a called telephone number, but that is not a route in the context of the invention because the called telephone number must still be translated into a route. If the call request message identifies a called telephone number and not a route, then switching system 101 transfers a query message to transaction agent 105 to obtain the route.

The query-action-return-response message sequence may follow many paths that pass through transaction agent 105. Transaction agent 105 may receive a query from any of the switching systems, transfer an action message to any of the service processing systems in response to the query, receive call-handling information in return, and provide the communication-handling information in a response to the querying switching system. For example, the query-action-return-response sequence may follow the following paths as indicated by the reference numbers of FIG. 1: 103-105-106-105-103; 102-105-109-105-102; 104-105-107-105-104; or 104-105-109-105-104.

Like switching systems 101-103, remote switching system 104 may be simplified by using service control system 110 instead of its own service logic. In addition, remote service processing system may exert service control over switching systems 101-104 through service control system 110.

In some examples, transaction agent 105 would select which service processing system to query—as opposed to using a set assignment. This selection could be based on matching the type of call with the capabilities of given service processing system. The selection could also be based on resource utilization where an attempt is made to load balance and direct tasks away from over-busy links, processors, and databases.

In some examples, transaction agent 105 may send multiple action messages to different service processing systems and correlate the call-handling data from the different service processing systems into a single response to the switching system. For example, transaction agent 105 may send an action message to service processing system 106 to validate the caller and send another action message to service processing system 109 to obtain a route. The transaction agent would receive call-handling information from service processing systems 106 and 109. The transaction agent would respond to the switching system with the selected route if the caller is correctly validated, and if not, respond with a call termination instruction and possibly a message to the invalid caller.

In some examples, transaction agent 105 may return multiple responses based on the call-handling data. For example, transaction agent 105 may receive a query from switching system 101, transfer a corresponding action message to service processing system 106 and receive call-handling data, respond to switching system 101 with the call-handling data, and also transfer the call-handling data to switching system 102. Transaction agent 105 may also transfer the call-handling data to other systems, such as interactive service platforms or billing systems.

In some examples, transaction agent 105 adds billing information to the responses. The switching systems then add the billing information to billing files, and typically add their own billing information to the file. The switching systems transfer the billing files to a billing system.

In some examples, transaction agent 105 communicates with systems that handle the communications, but that may not be considered to be switching systems. For example, an interactive service platform may provide messages to a caller to prompt caller inputs in return. The caller inputs may indicate account numbers, menu selections, or other information. Transaction agent 105 may transfer information or instructions to a platform to assist in call-handling. Such information could include the caller number or called number. Such instructions could identify a particular call-handling application to execute on the call.

In some examples, transaction agent 105 may transfer information or instructions to processing systems that may not be considered as service processing systems. For example, transaction agent 105 may transfer information to a billing systems indicating characteristics of the communications and the processing that was used for the communication. In another example, transaction agent may transfer information or instructions to a context server. Such information could include call reference identification, caller number, information collected from a caller, called number, and other call or caller related data. Typically, other systems may query the context server to obtain the information.

FIG. 2 illustrates transaction agent 105 and service processing system 106 in an example of the invention. Transaction agent 105 includes communication interface 211 and processing system 212 that are linked together. Processing system 212 includes storage system 213 that stores software 214. Communication interface 211 is also linked to switching systems 101-104 and service processing systems 106-109. Service processing system 106 includes communication interface 215 and processing system 216 that are linked together. Processing system 215 includes storage system 217 that stores software 218. Communication interface 215 is also linked to communication interface 211.

Communication interfaces 211 and 215 could be comprised of network interface cards, communication ports, or some other type of communication devices. Processing systems 212 and 216 could be comprised of computer circuitry and equipment or some other type of automated processing system. Storage systems 213 and 217 could be comprised of memory circuits, memory drives, or some other type of memory devices. Processing systems 212 and 216 respectively retrieve and execute software 214 and 218 from storage systems 213 and 217.

Software 214 and 218 may include operating systems, utilities, drivers, networking software, application software, and other software typically loaded onto a communications computer system. Software 214 and 218 could comprise program code, firmware, or some other form of machine-readable processing instructions. When executed by processing systems 212 and 216, software 214 and 218 directs processing systems 212 and 216 to operate in accord with this disclosure. Based on this disclosure, those skilled in the art could modify the Open Call Platform from Hewlett-Packard to make and use transaction agent 105. Based on this disclosure, those skilled in the art could modify the Service Control Point from Compaq to make and use service processing system 106.

FIG. 3 illustrates a logical architecture in an example of the invention. The logical architecture includes pre-discrimination logic 320 and action logic 325. Pre-discrimination logic 320 includes branch logic 321, parallel logic 322, and merge logic 323. Parallel logic 322 includes pre-discrimination functions 1-N. Action logic 325 includes selection logic 326, action functions 327, and result logic 328. Action logic 325 includes action functions 1-N. Action functions 1-N could reside locally in service processing systems 106-108 or remotely in service processing system 109.

In operation, parallel branch logic 321 receives a query message from a switching system and selects pertinent data from the query message. Parallel branch logic 321 provides the pertinent data in parallel to the pre-discrimination functions 1-N in parallel logic 322. All pre-discrimination functions 1-N execute concurrently on the data and pass their output to merge logic 323. Merge logic 323 processes the outputs to transfer an action message to selection logic 326 in action logic 325. Selection logic 326 transfers pertinent data from the action message to the selected action function. The selected action function processes the pertinent data to produce the communication-handling data. Typically the communication-handling data is routing information. The selected action function transfers the communication-handling data to return logic 328. Return logic 328 transfers a return message indicating the communication-handling data to transaction agent 105. Transaction agent 105 transfers a response message indicating the communication-handling data to the switching system that sent the query.

In some examples, some or all of the pre-discrimination functions 1-N may first determine if the function needs to run, so unnecessary pre-discrimination functions may self-terminate instead of running. Various tests on the data could be devised to cause self-termination.

In some examples of the invention, pre-discrimination logic 320 resides in transaction agent 105 and action logic 325 resides in service processing system 106. In these examples, the remote action functions could reside in service processing system 109 or other remote systems.

Typically, transaction agent 105 receives multiple query messages in a concurrent fashion. There can be multiple concurrent instances of pre-discrimination logic 320 to process the multiple concurrent query messages. Typically, the same functions occurring in different instances of pre-discrimination logic 320 will use the same data. Typically, action logic 325 receives action messages in a concurrent fashion. There can be multiple concurrent instances of action logic 325 to process the multiple concurrent action messages. Typically, the same action functions occurring in different instances of action logic 325 will use the same data.

In some examples, some pre-discrimination functions 1-N have an associated data structure. Each data structure has entries, and each entry has an associated score and action type. Each action type points to one of the action functions 327 in action logic 325. Thus, the entries in a given data structure may have different scores and may point to different action functions. A pre-discrimination function first extracts specific data from the query and then attempts to match the extracted data with an entry in its data structure. For example, a called number pre-discrimination function would extract the called number from the query, and then try to match the called number with an entry in its called number data structure. The entries may use wildcards, ranges, and other techniques for matching. If matches occur, the pre-discrimination functions 1-N provide the scores and action types for the matches to merge logic 328 along with the extracted data. Merge logic 328 selects the action type with the highest score and populates an action message for the action type with the pertinent extracted data.

In case of multiple matches with tie scores, the match that is more explicit is selected. Matches having specific digits are more explicit than matches having wildcards. A match is also more explicit if it has more specific digits than another match. The most explicit match is an exact match of the most specific digits without wildcards or ranges.

In some examples, some of the pre-discrimination functions 1-N may provide additional information to merge logic 328 for inclusion in the action message. For example, a pre-discrimination function may determine if the requested communication is between two specific parties, and if so, provide such information to merge logic 328 for inclusion in the action message. In another example, a pre-discrimination function may determine a set of interactive service platforms or service processing systems with the best current availability, and provide such information to merge logic 328 for inclusion in the action message.

The action functions are typically comprised of action blocks. Various blocks may be re-used in numerous action functions. For example, a caller number validation block may be used in each action function that needs to validate a caller number. In some examples, each block is a software object, and an action function is a collection of objects that are linked together in some sequence.

Figure 4:
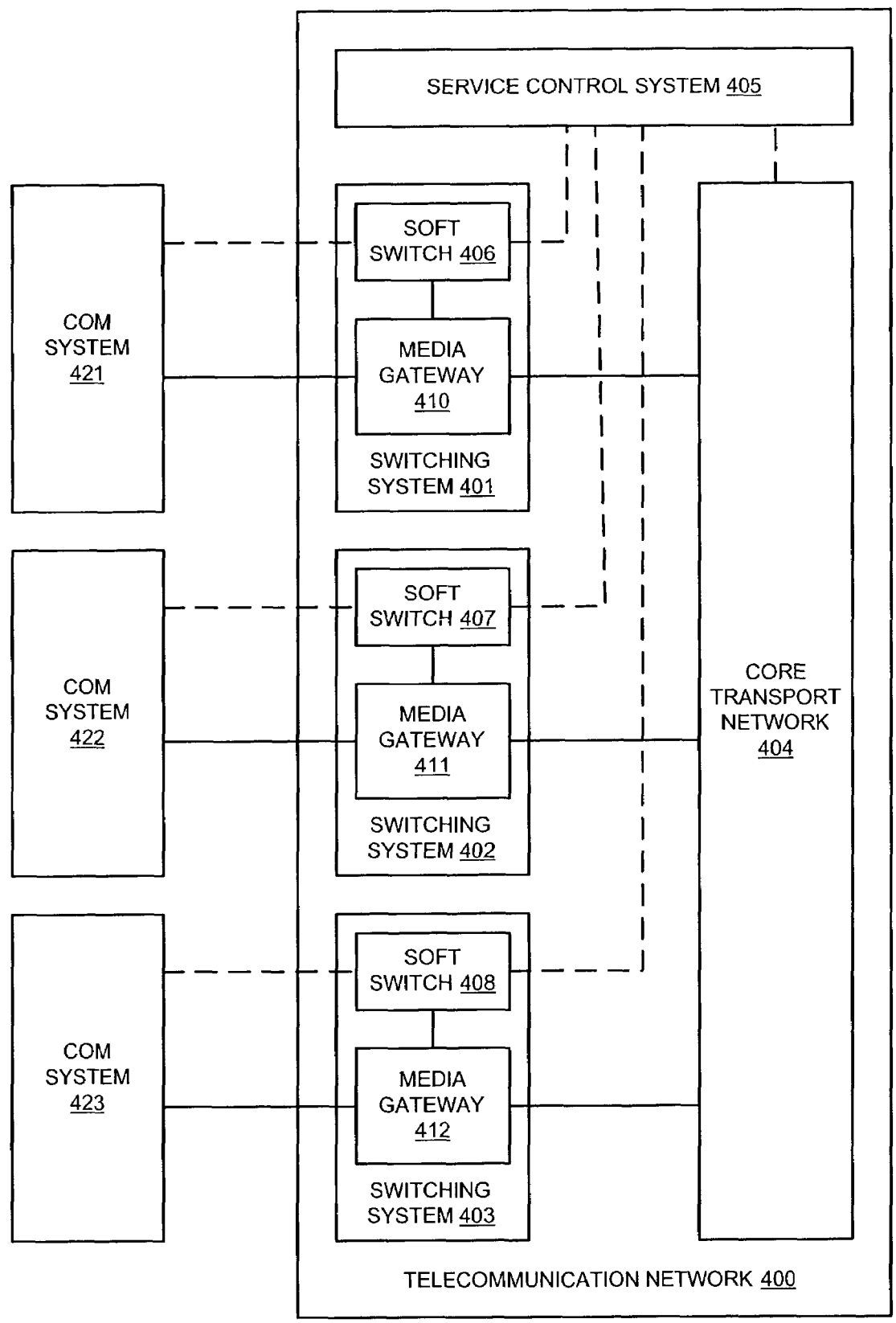
FIG. 4 illustrates a telecommunication network in an example of the invention.
Figure 5:
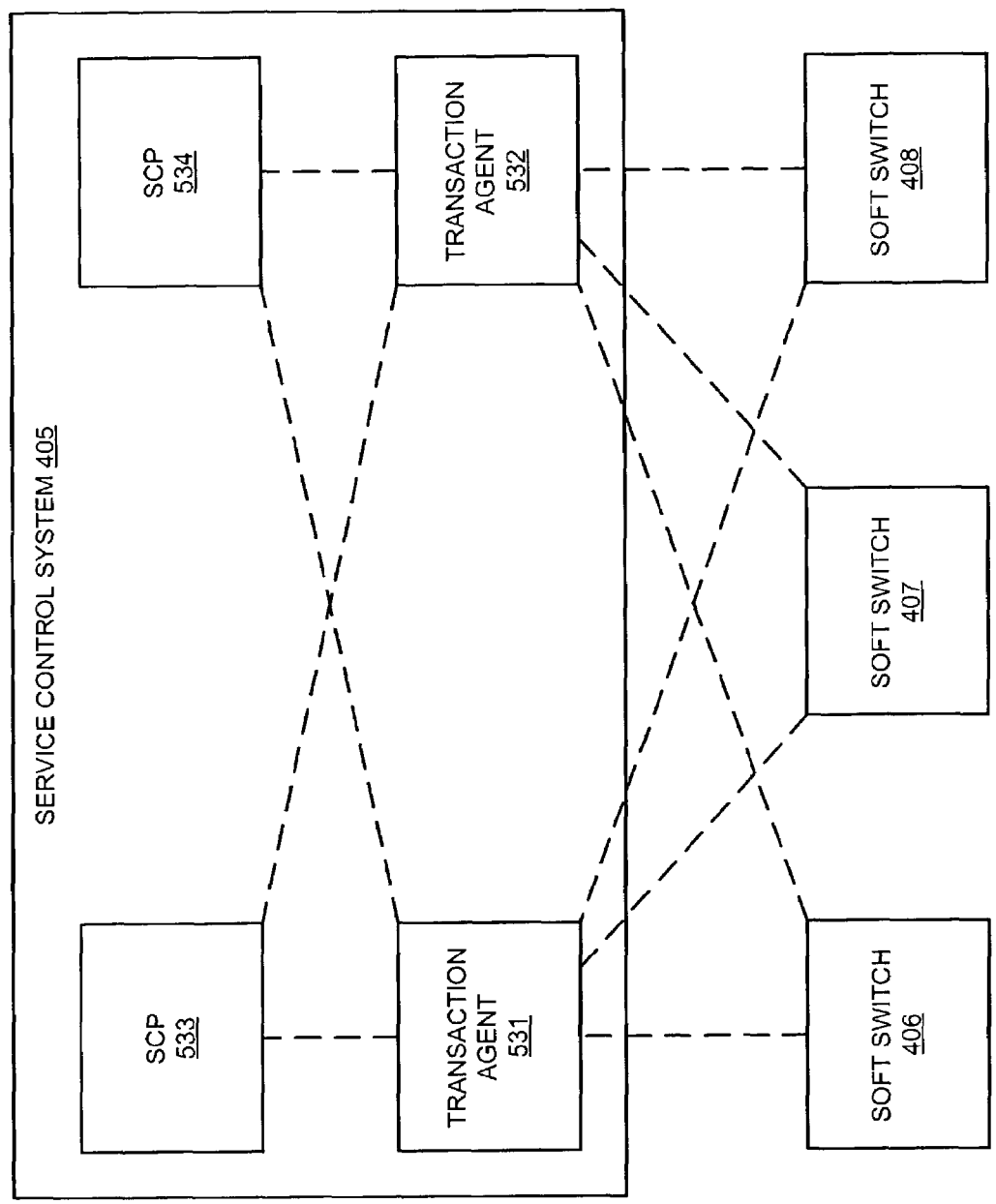
FIG. 5 illustrates a service control system in an example of the invention.
Figure 6:
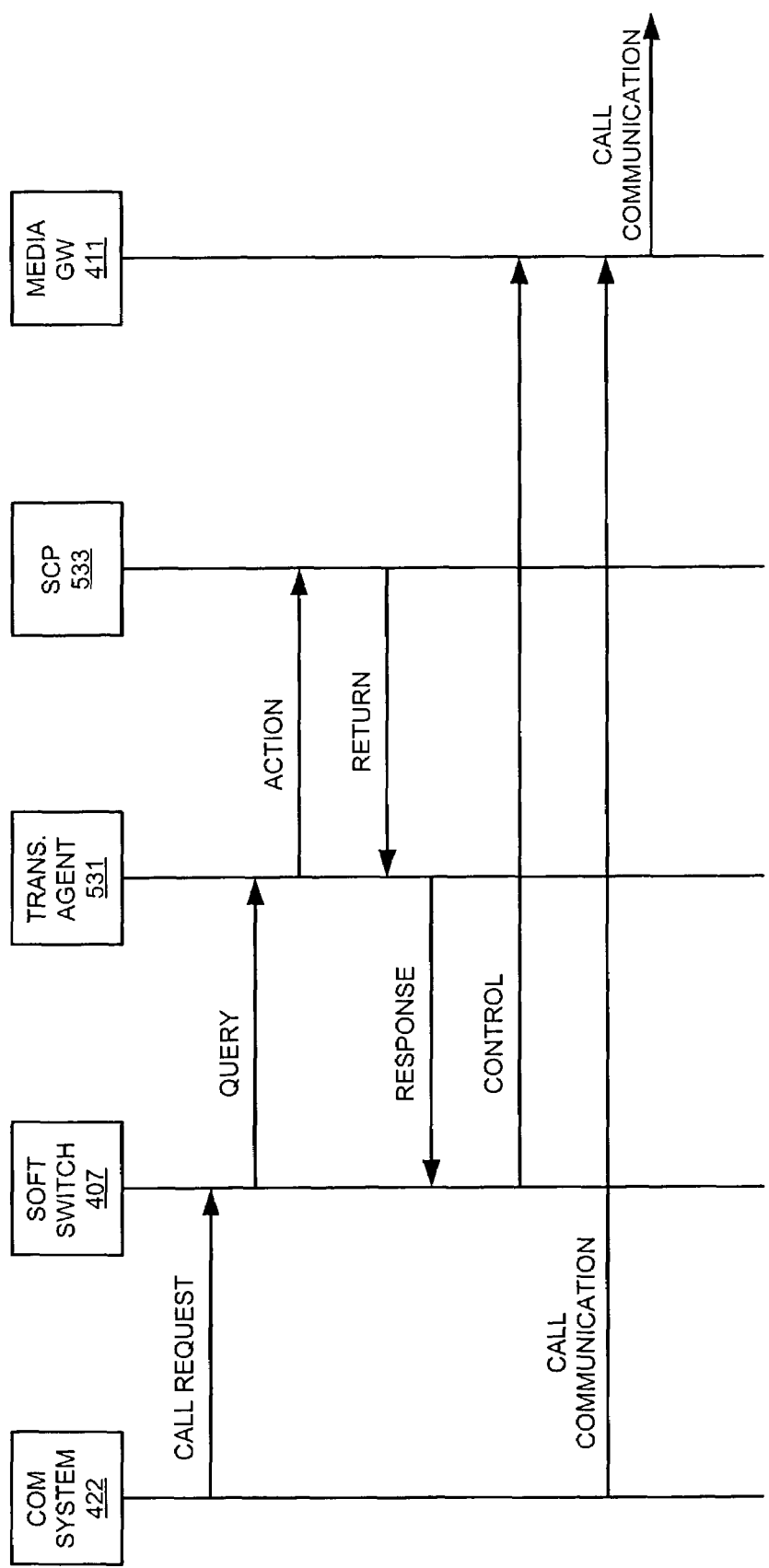
FIG. 6 illustrates a call flow in an example of the invention.

Telecommunication Network—FIGS. 4-6

FIG. 4 illustrates telecommunication network 400 in an example of the invention. Telecommunication network 400 includes switching systems 401-403, core transport system 404, and service control system 405. Switching system 401 includes soft switch 406 and media gateway 410. Switching system 402 includes soft switch 407 and media gateway 411. Switching system 403 includes soft switch 408 and media gateway 412. Service control system 405 is linked to soft switches 406-408. Core transport system 404 is linked to media gateways 410-412. Soft switches 406-408 are respectively linked to media gateways 410-412. Communication systems 421-423 are respectively linked to switching systems 401-403. Note that the typical number of communication systems and switching systems has been restricted for clarity.

Communication systems 421-423 comprise equipment that transfer call requests to soft switches 406-408 and transfer call communications to media gateways 410-412. The communications may include voice, data, video, audio, or some other user information. Communication systems 421-423 could be equipment located at a business, residence, local telephone network, long distance telephone network, internet service provider, wireless communication system, satellite communication network, international communication network, packet communication network, or some other type of system that requires communication services.

Soft switches 406-408 process call requests to obtain routes and transfer control messages indicating the routes to media gateways 410-412. Media gateways 410-412 transfer the call communications over the routes indicated in the control messages. The routes are typically from media gateways 410-412 through core transport network 404 to a destination. Based on this disclosure, those skilled in the art could modify the CS2K system from Nortel Networks to make and use switching systems 401-403.

Core transport system 404 could be conventional and implement technologies such as Asynchronous Transfer Mode (ATM), Internet Protocol (IP), Time Division Multiplex (TDM), Synchronous Optical Network (SONET), Wavelength Division Multiplexing (WDM), satellite communications, wireless communications, optical communications, or some other communications technology.

FIG. 5 illustrates service control system 405 in an example of the invention. Service control system includes transaction agents 531-532 and SCPs 533-534. In telecommunication network 400, each soft switch is linked to at least two transaction agents, so soft switches 406-408 are each linked to transaction agents 531-532. For a given soft switch, one of the transaction agents functions as a primary resource and the other transaction agent functions as a secondary resource. In telecommunication network 400, each transaction agent is linked to at least two SCPs, so transaction agents 531-532 are each linked to SCPs 533-534. For a given transaction agent, one of the SCPs functions as a primary resource, and the other SCP functions as a secondary resource. From FIG. 3, transaction agents 531-532 could include pre-discrimination logic 320, and SCPs 533-534 could include action logic 325.

Referring to FIG. 6, communication system 422 transfers a call request to soft switch 407. Examples of the call request include Signaling System #7 (SS7) Initial Address Messages (IAMs), Integrated Services Digital Network (ISDN) call set-up messages, GR-303 call set up messages, superframe signaling, in-band Dual Tone Multi-Frequency (DTMF) tones, Simple Internet Protocol (SIP) messages, or some other request for call communications. In response to the call request, soft switch 407 transfers a query to transaction agent 531. One example of a query is Transaction Capability Application Part (TCAP) message that indicates the called number and nature of called number, calling number and nature of calling number, calling line identification, originating switching system identification, originating trunk identification, trigger index, and call reference identification. Another example of a query is a SIP query.

Transaction agent 531 processes the query using parallel pre-discrimination logic to transfer an action message to SCP 533. SCP 533 processes the action message with selected action logic to determine a route for the call. Examples of a route include a downstream switch, network element, connection, switch/trunk, or packet address (such as IP or ATM). The route is distinguishable from a telephone number that must be translated to a route.

SCP 533 transfers a return message to transaction agent 531 indicating the route. Transaction agent 531 processes the return message to transfer a response message to soft switch 407 indicating the route. Soft switch 407 processes the response message to implement the route for the call. Soft switch 407 transfers a control message to media gateway 411 indicating the incoming call from communication system 422 and instructions to implement the selected route. Media gateway 411 receives call communications from communication system 422, and in response to the control message, transfers the call communications through core transport network 404 to the proper destination using the route. If the route selected by the service control system is a switch/trunk, then the soft switch and media gateway would transfer the call communications to the switch, and the switch would transfer the call communications over the trunk. If the route selected by the service control system is a packet address, then the soft switch and media gateway would transfer the call communications in packets having the address.

The decision by the soft switch to send the query may take many forms. The soft switch may first check for a route in the call request before transferring a query to the transaction agent. If there is no route, then the soft switch transfers the query to the transaction agent, but if there is a route in the call request, then the soft switch implements the route. For example, in response to a call request, the soft switch could transfer a query to the transaction agent unless the call request is an IAM that identifies a route in the generic digits field. In response to a call request, the soft switch could transfer a query to the transaction agent unless the call request indicates a switch/trunk or a packet address. The soft switch could also transfer a query in response to every call request.

As described for FIG. 3, a set of a parallel pre-discrimination functions operate on data from the query. The parallel functions extract appropriate data, attempt to match the extracted data in data structures, and provide corresponding scores and action types for any matches. An action message for the action type with the highest score is then populated with the appropriate extracted data. Examples of the parallel pre-discrimination functions include: trigger index, originating switching system, originating trunk, nature of called number, nature of calling number, called number prefix digits, called number, caller number, Originating Line Indicator (OLI), Carrier Identification Code (CIC), calling line identification, and call reference identification. If desired combinations of elements may also be grouped in a single function. For example, a pre-discrimination function could look for a particular match of both caller and called number. A highly simplified version of a called number data structure is given below where asterisks represent wild cards.

| CALLED NUMBER DATA STRUCTURE | | |
|---|---|---|
| ENTRIES | SCORE | ACTION TYPE |
| 1-800-*-** | .5 | GENERIC TOLL FREE |
| 1-800-555-1000 | 1 | CUSTOMER X PROGRAM |
| 1-703-*-** | .5 | WASHINGTON DC POTS ROUTE PLAN |
| 1-703-123-**** | .7 | CUSTOMER Y PROGRAM |

For example, the called number pre-discrimination function extracts the called number (if any) from the query data and attempts to match the called number with entries in a called number data structure. If multiple matches are found the more explicit match is used. The score and the action type for a selected called number match are output along with the extracted called number. Likewise, the caller number pre-discrimination function extracts the caller number (if any) from the query data and attempts to match the caller number with entries in a caller number data structure. If multiple matches are found, then the more explicit match is used. The score and the action type for a selected caller number match are output along with the extracted caller number. Other pre-discrimination functions would operate in a similar fashion for their particular data. From all pre-discrimination function outputs, the action type with the highest score is selected, and in the case of a tie, the more explicit match is used. The selected action type corresponds to a specific action message that is populated with the extracted data—including the extracted caller number and extracted called number if appropriate. The action message points to a specific action function.

The SCP processes the action message with the specific action function that corresponds to the action message. Examples of action logic include: local telephone call processing, domestic long distance telephone call processing, international telephone call processing, wireless telephone call processing, packet network telephone call processing, Internet telephone call processing, toll-free telephone call processing, calling card telephone call processing, Virtual Private Network (VPN) telephone call processing, POTS telephone call processing, Dedicated Access Line (DAL) telephone call processing, Wireless Government Emergency Telephone System processing, operator services telephone call processing, packet network data communication processing, Internet data communication processing, exception processing, and remote system call processing. In addition, specific customers may have their own telephone call processing and data communication processing action functions.

Figure 7:
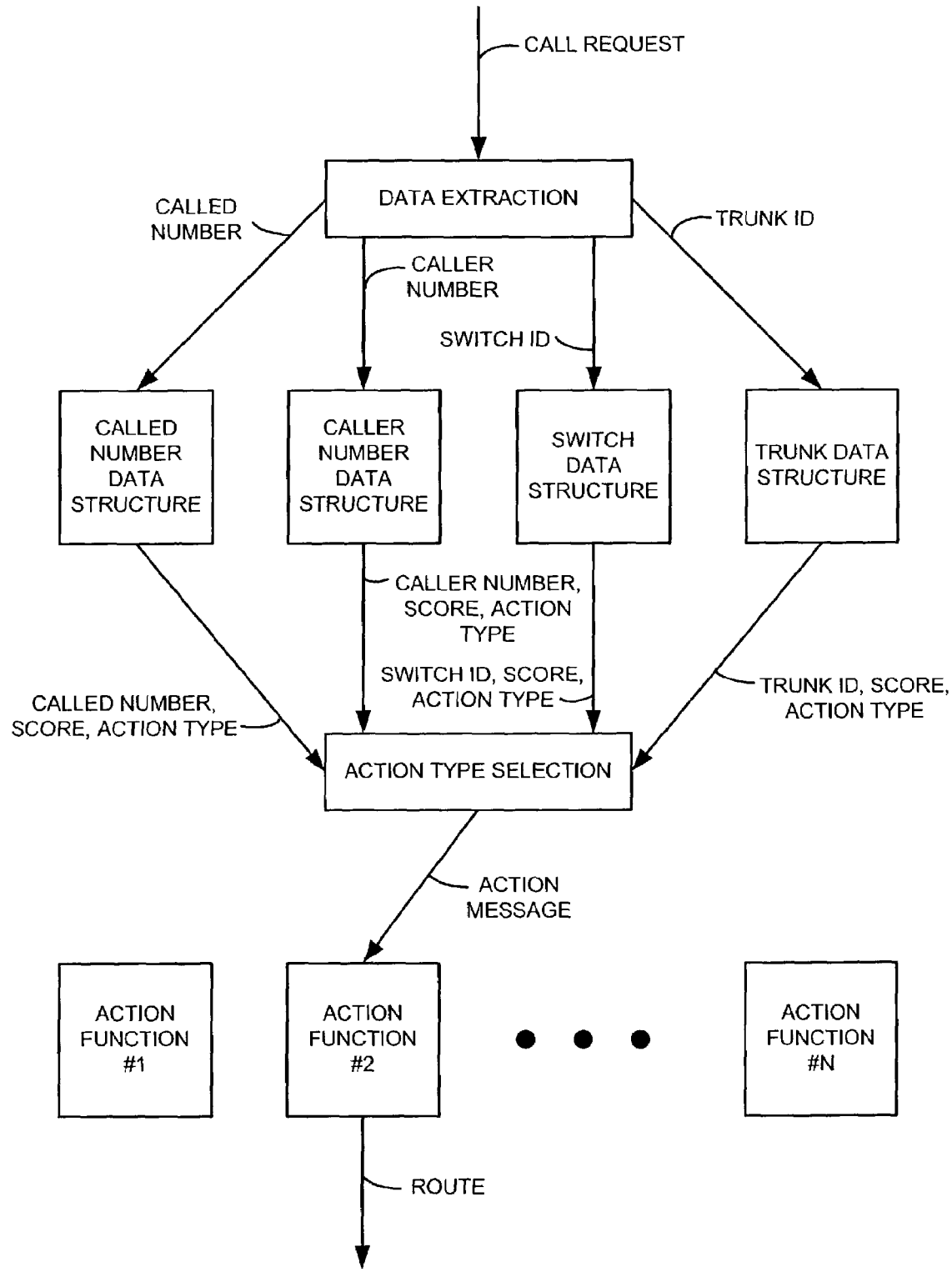
FIG. 7 illustrates a logical flow for centralized service control in an example of the invention.

FIG. 7 illustrates a logical flow in an example of the invention. In this simple example, various data from the call request message are extracted and provided in parallel to a set of data structures that operate concurrently. The extracted data comprises the called number, caller number, originating switch ID, and originating trunk ID, and there are four corresponding data structures with one each for called number, caller number, originating switch, and originating trunk. The data structures represent the parallel pre-discrimination functions described above. Each data structure attempts to match its extracted data with data structure entries. In case of multiple matches, the more explicit match is used. Each of the data structures transfers its extracted data along with the score and action type for their match (if any). The action type with highest score across all data structures is selected, and an action message for the selected action type is populated with the appropriate extracted data—called number, caller number, originating switch, and originating trunk. The action message is transferred to the action function that corresponds to the action message, and thus, to the selected action type. The action function processes the action message to provide a route.

Service Examples

The following examples serve to further illustrate the invention and to distinguish features of the invention from the prior art.

Consider the example where a network centralizes all POTS call processing logic through the transaction agent and service processing system. If a new area code is added, then the POTS called number processing logic in the centralized system would be modified to handle the new area code. Advantageously, the logic in multiple switching systems would not have to be modified in response to the new area code.

Consider the example where a network adds packet-based switching systems in addition to their legacy TDM-based switching systems to handle traffic growth. With service logic deployed through a transaction agent and service processing system, extensive service logic does not need to be deployed in each of the new packet-based systems.

Consider the example where a customer desires to host their own routing plan for calls to a given toll-free number. A new action function to implement the desired routing plan would be devised—typically using some existing action blocks. An action message would be defined to include the appropriate data for the action function. An action type and score would be placed with an entry for the toll-free number in the called number data structure of the transaction agent. The customer would also set up their own remote call processor to process the new action messages with the action function that implements their routing plan. Since calls to the toll-free number would receive the highest score for the called number match, the new action message would be populated with the appropriate data and transferred to the remote call processor for route selection. Advantageously, switching systems do not need to be programmed to recognize the toll-free number or to transfer queries to the remote call processor.

Consider the example where a wireless network transfers calls to a long distance network. The wireless switching system could transfer a query to a transaction agent shared by both wireless and long distance networks, and a service processing system could perform both the wireless network and long distance network caller validations from a central location. Advantageously, neither of the switching systems need to host the caller validation logic.

Consider the example where both class 4 switches and Internet routers handle toll free calls. The transaction agent may receive TCAP queries from the class 4 switches and receive SIP queries from the routers. Both types of queries may result in the same type of action messages that are handled by the same toll-free action function. Advantageously, the action function does not need to be customized to handle TCAP and SIP messages. In addition, the switches and routers may use their own query formats.

Consider the example where a major event congests traffic in a given trunk group, switch, or region. Instead of re-programming multiple switching systems to avoid the congestion, the centralized service logic may be changed—possibly in only a few locations—to route traffic away from the congestion.

Consider the example where a communication between two parties must be specially handled. For example, it must be encrypted or monitored. The transaction agent could be modified to identify such a communication and send an action message to the logic to implement the special handling. Advantageously, the logic in the switching systems could remain unaffected.

From the above description, it should be appreciated that multiple different types of systems may send various types of queries to the transaction agent, and these systems do not require their own service logic. This eases the introduction of different types of switching systems and network elements. The transaction agent effectively selects the action function and provides the selected action function with the proper data in the format suitable for the action function. Thus, the actions functions do not need custom interfaces for each type of switching system. In addition, the transaction agent provides a central point of access to service logic. Fewer copies of the service logic now reside in fewer locations, so modifications and updates are much easier. The relative ease of changes allows more dynamic customer programs and traffic control techniques to be implemented.

The invention claim is:

1. A communication system comprising:
    a first switching system configured to receive and process a first communication request for a first communication to determine if the first communication request indicates a first route, if the first communication request does not indicate the first route, to transfer a first query message, receive and process a first response message indicating the first route, and transfer the first communication using the first route, and if the first communication request does indicate the first route, then to transfer the first communication using the first route;
    a service control system configured to receive and process the first query message to generate and transfer the first response message indicating the first route; and
    wherein the first route identifies one of a downstream switch, network element, connection, switch/trunk, and packet address.

2. The communication system of claim 1 further comprising:
    a second switching system configured to receive and process a second communication request for a second communication to determine if the second communication request indicates a second route, if the second communication request does not indicate the second route, to transfer a second query message, receive and process a second response message indicating the second route, and transfer the second communication using the second route, and if the second communication request does indicate the second route, then to transfer the second communication using the second route; and wherein
    the service control system is configured to receive and process the second query message to generate and transfer the second response message indicating the second route.

3. The communication system of claim 2 wherein the first query message and the second query message have different query message formats.

4. The communication system of claim 2 wherein the first switching system and the second switching system are from different manufacturers.

5. The communication system of claim 2 wherein the first switching system and the second switching system are in different communication systems.

6. The communication system of claim 2 wherein the first switching system comprises a one of a class four switch and a class five switch and the second switching system comprises one of a packet switch and a packet router.

7. The communication system of claim 2 wherein the first switching system comprises one of a class four switch and a class five switch and the second switching system comprises a wireless switch.

8. The communication system of claim 2 wherein the first switching system comprises one of a packet switch and a packet router and the second switching system comprises a wireless switch.

9. The communication system of claim 1 wherein the service control system is configured to process the query message with multiple parallel functions to generate an action message and to process the action message to select the first route.

10. The communication system of claim 9 wherein one of the parallel functions comprises a called number function.

11. The communication system of claim 9 wherein one of the parallel functions comprises a nature of number function.

12. The communication system of claim 9 wherein one of the parallel functions comprises a caller number function.

13. The communication system of claim 9 wherein one of the parallel functions comprises an originating line identification function.

14. The communication system of claim 9 wherein one of the parallel functions comprises a originating switching system function.

15. The communication system of claim 9 wherein one of the parallel functions comprises a originating trunk function.

16. The communication system of claim 9 wherein one of the parallel functions comprises a trigger index function.

17. The communication system of claim 9 wherein one of the parallel functions comprises a call reference identification function.

18. The communication system of claim 9 wherein one of the parallel functions comprises a carrier identification code function.

19. A communication method comprising:
    in a first switching system, receiving and processing a first communication request for a first communication to determine if the first communication request indicates a first route;

in the first switching system, if the first communication request does indicate the first route, then transferring the first communication using the first route;

in the first switching system, if the first communication request does not indicate the first route, transferring a first query message, receiving and processing a first response message indicating the first route, and transferring the first communication using the first route;

in a service control system, receiving and processing the first query message to generate and transfer the first response message indicating the first route; and wherein the first route identifies one of a one of a downstream switch, network element, connection, switch/trunk, and packet address.

20. The communication method of claim 19 further comprising:

in a second switching system, receiving and processing a second communication request for a second communication to determine if the second communication request indicates a second route;

in the second switching system, if the second communication request does indicate the second route, then transferring the second communication using the second route;

in the second switching system, if the second communication request does not indicate the second route, transferring a second query message, receiving and processing a second response message indicating the second route, and transferring the second communication using the second route; and in the service control system, receiving and processing the second query message to generate and transfer the second response message indicating the second route.

21. The communication method of claim 20 wherein the first query message and the second query message have different query message formats.

22. The communication method of claim 20 wherein the first switching system and the second switching system are from different manufacturers.

23. The communication method of claim 20 wherein the first switching system and the second switching system are in different communication systems.

24. The communication method of claim 20 wherein the first switching system comprises one of a class four switch and a class five switch and the second switching system comprises one of a packet switch and a packet router.

25. The communication method of claim 20 wherein the first switching system comprises one of a class four switch and a class five switch and the second switching system comprises a wireless switch.

26. The communication method of claim 20 wherein the first switching system comprises one of a packet switch and a packet router and the second switching system comprises a wireless switch.

27. The communication method of claim 19 wherein, in the service control system, processing the first query message to generate and transfer the first response message comprises processing the first query message with multiple parallel functions to generate an action message and processing the action message to select the first route.

28. The communication method of claim 27 wherein one of the parallel functions comprises a called number function.

29. The communication method of claim 27 wherein one of the parallel functions comprises a nature of number function.

30. The communication method of claim 27 wherein one of the parallel functions comprises a caller number function.

31. The communication method of claim 27 wherein one of the parallel functions comprises an originating line identification function.

32. The communication method of claim 27 wherein one of the parallel functions comprises a originating switching system function.

33. The communication method of claim 27 wherein one of the parallel functions comprises a originating trunk function.

34. The communication method of claim 27 wherein one of the parallel functions comprises a trigger index function.

35. The communication method of claim 27 wherein one of the parallel functions comprises a call reference identification function.

36. The communication method of claim 27 wherein one of the parallel functions comprises a carrier identification code function.

* * * * *